United States Patent
Mauldin

[11] Patent Number: 5,809,685
[45] Date of Patent: Sep. 22, 1998

[54] FISH ACTUATED HOOKING DEVICE

[76] Inventor: Ben H. Mauldin, 6726 Lakewood Blvd., Dallas, Tex. 75214

[21] Appl. No.: 689,982

[22] Filed: Aug. 15, 1996

[51] Int. Cl.[6] .......................... A01K 85/01; A01K 83/02
[52] U.S. Cl. ........................................... 43/35; 43/36
[58] Field of Search .................... 43/34, 35, 36, 43/37, 42.41

[56] References Cited

U.S. PATENT DOCUMENTS

| | | | |
|---|---|---|---|
| 627,344 | 6/1899 | Maroney | 43/35 |
| 906,519 | 12/1908 | Fischer | 43/35 |
| 1,537,266 | 5/1925 | Ryan | 43/42.41 |
| 1,697,120 | 1/1929 | Johns | 43/35 |
| 1,701,643 | 2/1929 | Stoll | 43/35 |
| 1,920,991 | 8/1933 | Lahm | 43/36 |
| 1,959,911 | 5/1934 | Fogelson | 43/35 |
| 1,994,878 | 3/1935 | Smith | 43/35 |
| 2,044,702 | 6/1936 | Kalyu | 43/36 |
| 2,079,509 | 5/1937 | Kettring | 43/35 |
| 2,097,221 | 10/1937 | Babbit | 43/35 |
| 2,134,841 | 11/1938 | Reese | 43/36 |
| 2,200,670 | 5/1940 | Hargrett | 43/36 |
| 2,205,773 | 6/1940 | Fox | 43/35 |
| 2,326,620 | 8/1943 | Charpentier | 43/35 |
| 2,520,065 | 8/1950 | Rudy | 43/35 |
| 2,589,343 | 3/1952 | Lieslik | 43/35 |
| 2,613,469 | 10/1952 | Haberkorn | 43/36 |
| 2,643,479 | 6/1953 | Stevenson | 43/36 |
| 2,667,006 | 1/1954 | Lehmann | 43/36 |
| 2,856,722 | 10/1958 | Byhre | 43/36 |
| 2,884,731 | 5/1959 | Hodgson | 43/424.1 |
| 3,018,582 | 1/1962 | Anderson | 43/35 |
| 3,337,980 | 8/1967 | Farajian et al. | 43/35 |
| 3,646,699 | 3/1972 | Zeman | 43/35 |
| 3,665,634 | 5/1972 | Baud | 43/35 |
| 3,816,953 | 6/1974 | Anttila | 43/36 |
| 4,528,770 | 7/1985 | McDiarmid | 43/35 |
| 4,562,661 | 1/1986 | Messinger et al. | 43/35 |
| 4,726,142 | 2/1988 | Tapley | 43/36 |
| 4,827,656 | 5/1989 | Ohnishi | 43/34 |
| 4,873,781 | 10/1989 | Bates | 43/35 |
| 5,097,619 | 3/1992 | Bologna | 43/35 |

*Primary Examiner*—Kurt Rowan
*Attorney, Agent, or Firm*—Jenkens & Gilchrist, P.C.

[57] ABSTRACT

A fish hooking device including a hollow body having an elongated slot along one side and an eyelet opening in one end, a transverse pin axle in the body, a hook rotatable on the axle between a first retracted position in the body and a second extended position through the slot in the body, a hook extension formed with the hook from the other side of the axle, a hook release mounted on the axle extendable through the slot in the body, a hook release extension formed with the hook release along an opposite side of the axle, a spring mounted in the body having a first hook operator end curved to a nomal position at which the hook is engaged by the spring and extended through the body slot to a position external of the body, a second latch end on the spring engageable with the hook extension to latch the hook at a retractable position and moveable to a hook release position by the hook release extension.

6 Claims, 4 Drawing Sheets

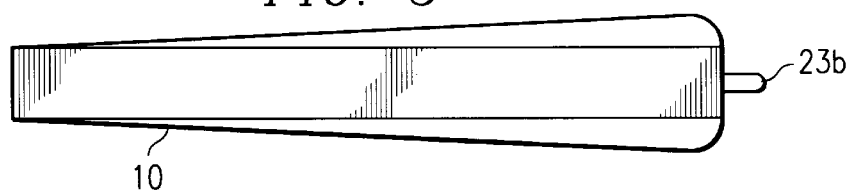
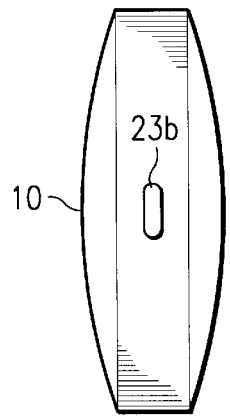
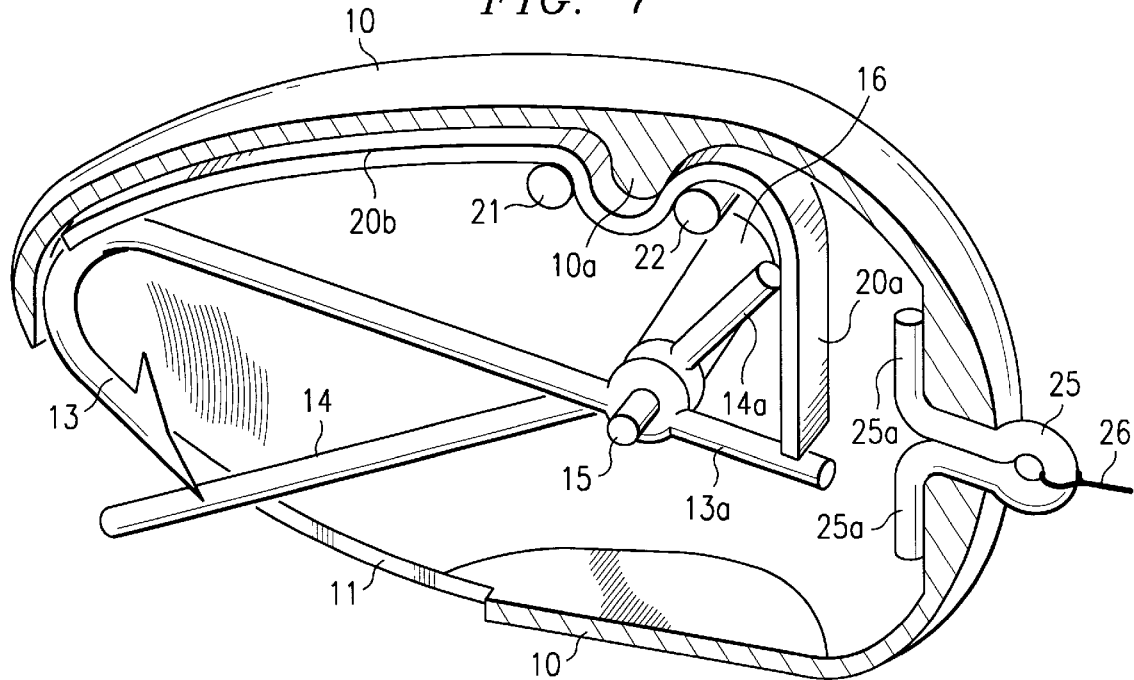

FISH ACTUATED HOOKING DEVICE

BACKGROUND OF THE INVENTION

1. Technical Field of the Invention

The present invention relates to fishing devices and, in particular, to a fish actuated hook.

2. Description of Related Art

Conventional fish hooks and lures generally employ one or more exposed hooks which require extremely careful handling by the person using the devices and, particularly, are subject to snagging as they are moved through water during use. A variety of fish hooking devices are known, including assemblies which have concealed hooks actuated by a fish striking the device. Such fish hooking devices are shown in the following U.S. Pat. No. 1,959,911, issued May 22, 1934; U.S. Pat. No. 2,097,221, issued Oct. 26, 1937; U.S. Pat. No. 2,520,065, issued Aug. 22, 1950; U.S. Pat. No. 2,643,479, issued Jun. 30, 1953; U.S. Pat. No. 3,665,634, issued May 30, 1972; U.S. Pat. No. 4,562,661, issued Jan. 7, 1986; and U.S. Pat. No. 4,827,656, issued May 9, 1989.

SUMMARY OF THE INVENTION

A fish actuated hooking device in accordance with the invention includes: a hollow body having a side opening; a transverse pin axle in the body; a fish hook rotatably mounted on the pin axle for movement between a retracted position in the body and an extended position out of the body through the slot; a hook release lever rotatably mounted on the pin axle extending outwardly through the body slot; a double spring in the body having one end biasing the hook to the extended position and a second end to latch the hook retracted in the body; and the hook release lever coacting with the second end of the spring to move the second of the spring from a hook latch position to a hook release position.

BRIEF DESCRIPTION OF THE DRAWINGS

A more complete understanding of the structure of the present invention may be obtained from the following Detailed Description taken in conjunction with the accompanying Drawings wherein:

FIG. 5 is a top view of a flat bodied form of the device of the invention illustrated in FIGS. 1–4;

FIG. 6 is an end view in elevation at the eyelet end of the device as shown in FIG. 5;

FIG. 7 is a longitudinal sectional view in perspective of a modified form of the device in FIG. 1 including an eyelet without a safety latch feature;

DETAILED DESCRIPTION OF THE PREFERRED EMBODIMENTS OF THE INVENTION

Figure 1:
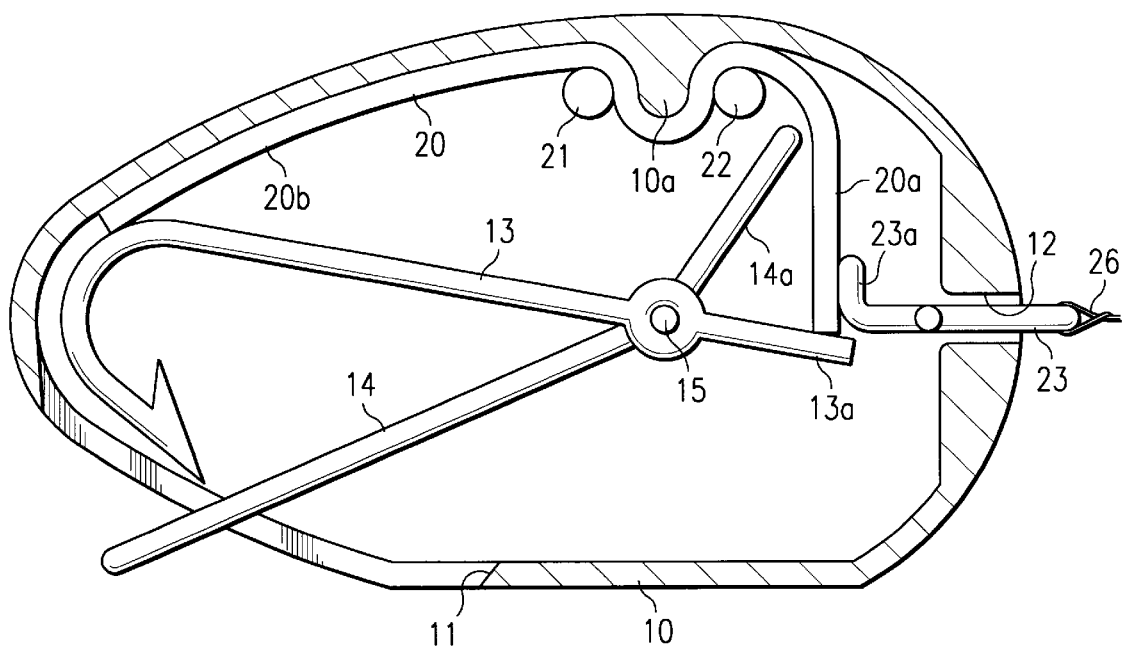
FIG. 1 is a longitudinal view in section and elevation of a fish actuated hooking device in accordance with the present invention showing the fish hook of the device latched at a retracted position within the body.
Figure 2:
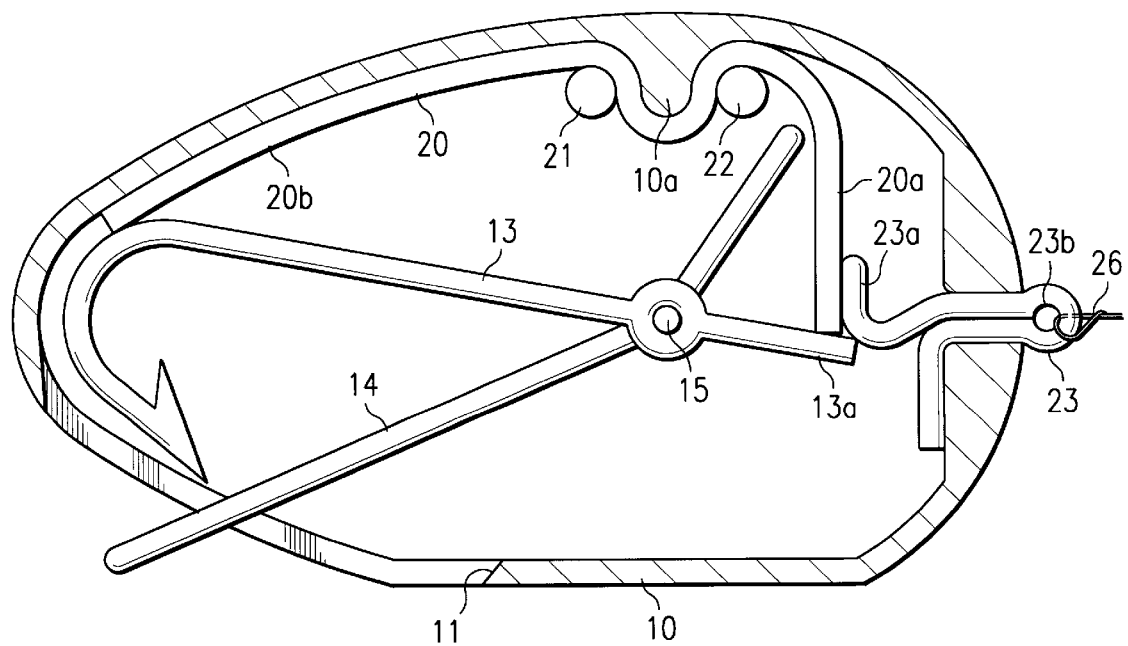
FIG. 2 is a view similar to FIG. 1 showing the eyelet latch rotated to a release position and the hook retracted in the body.
Figure 3:
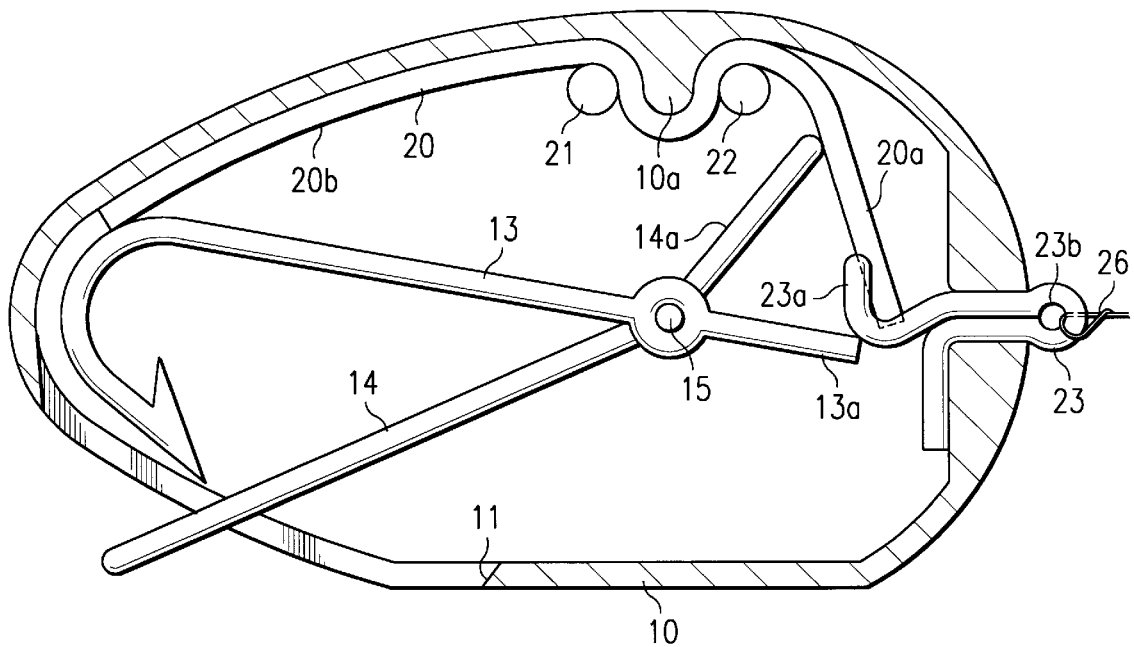
FIG. 3 is a view similar to FIGS. 1 and 2 showing the eyelet latch at the rotated release position and the second end of the operating spring moved to a released position by the hook release lever responsive to engagement by a fish.
Figure 4:
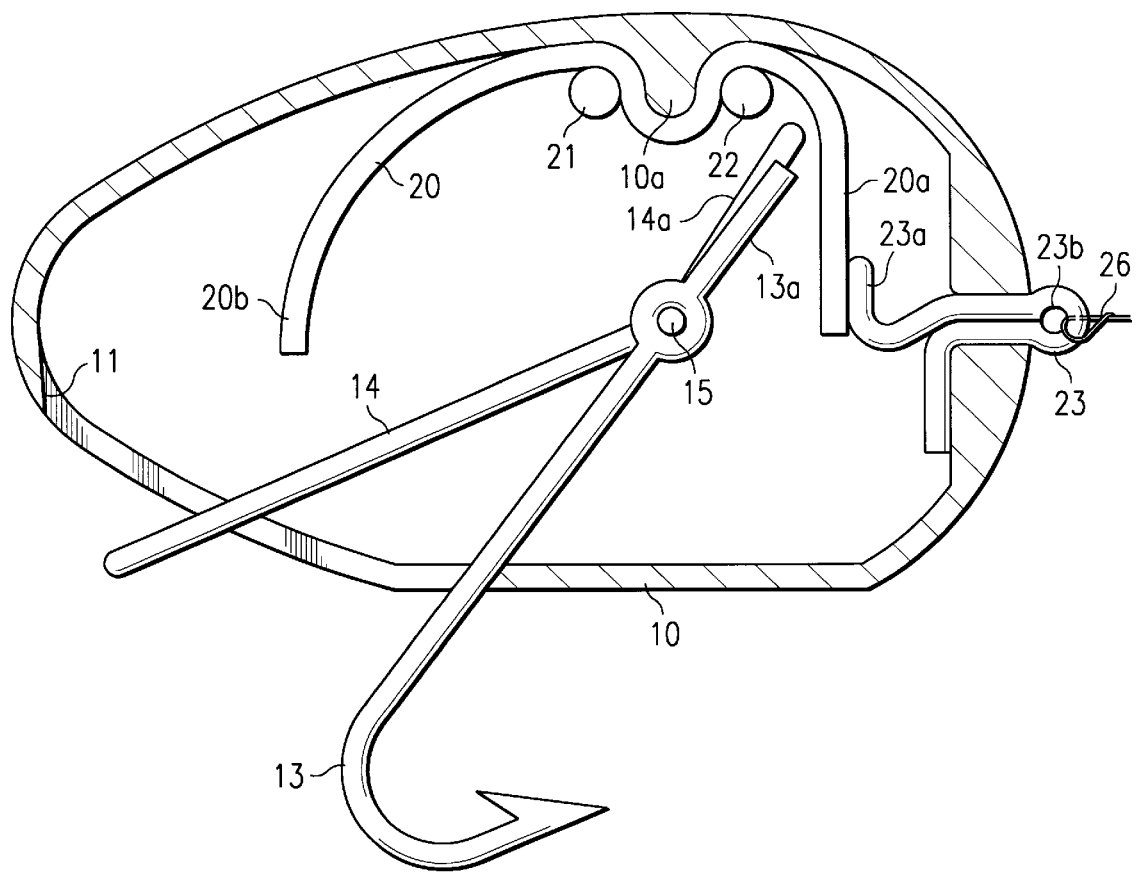
FIG. 4 is a view similar to FIGS. 1–3 after the first end of the spring has rotated the hook extending the hook through the slot exterior of the body.
Figure 8:
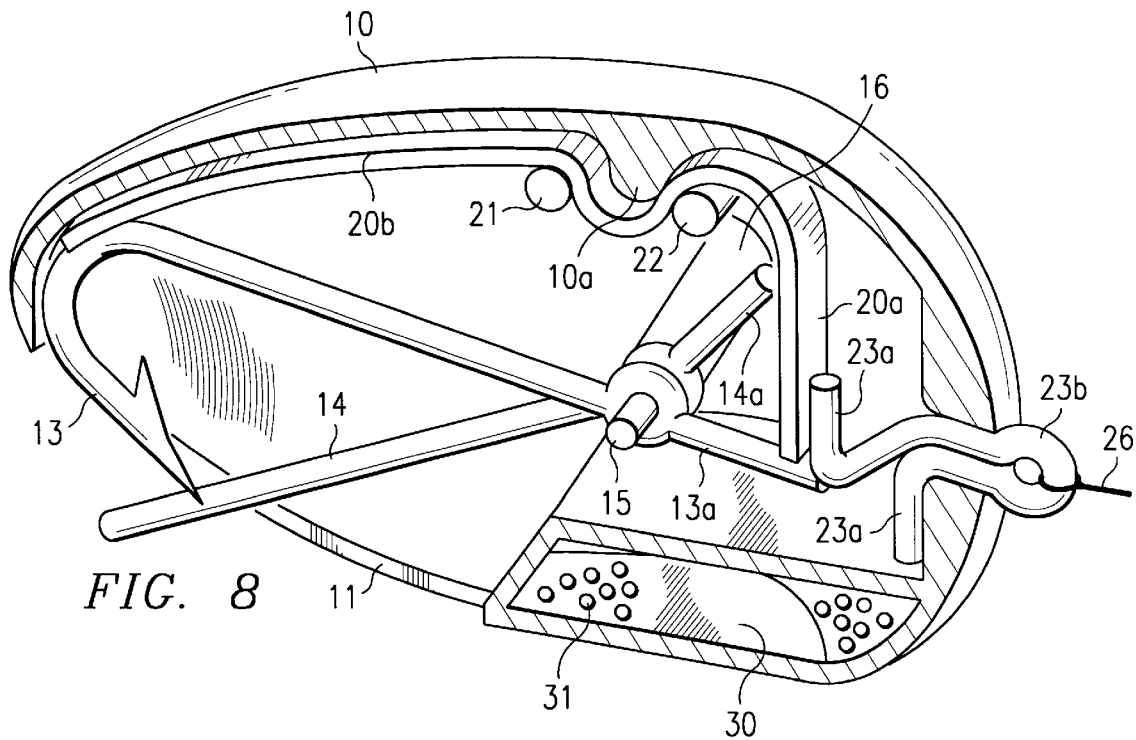
FIG. 8 is a longitudinal sectional view similar to FIG. 7 illustrating a further modified form of the device having a sound chamber and an eyelet latch as shown in FIGS. 1–3, showing the hook released as also illustrated in FIG. 1.
Figure 9:
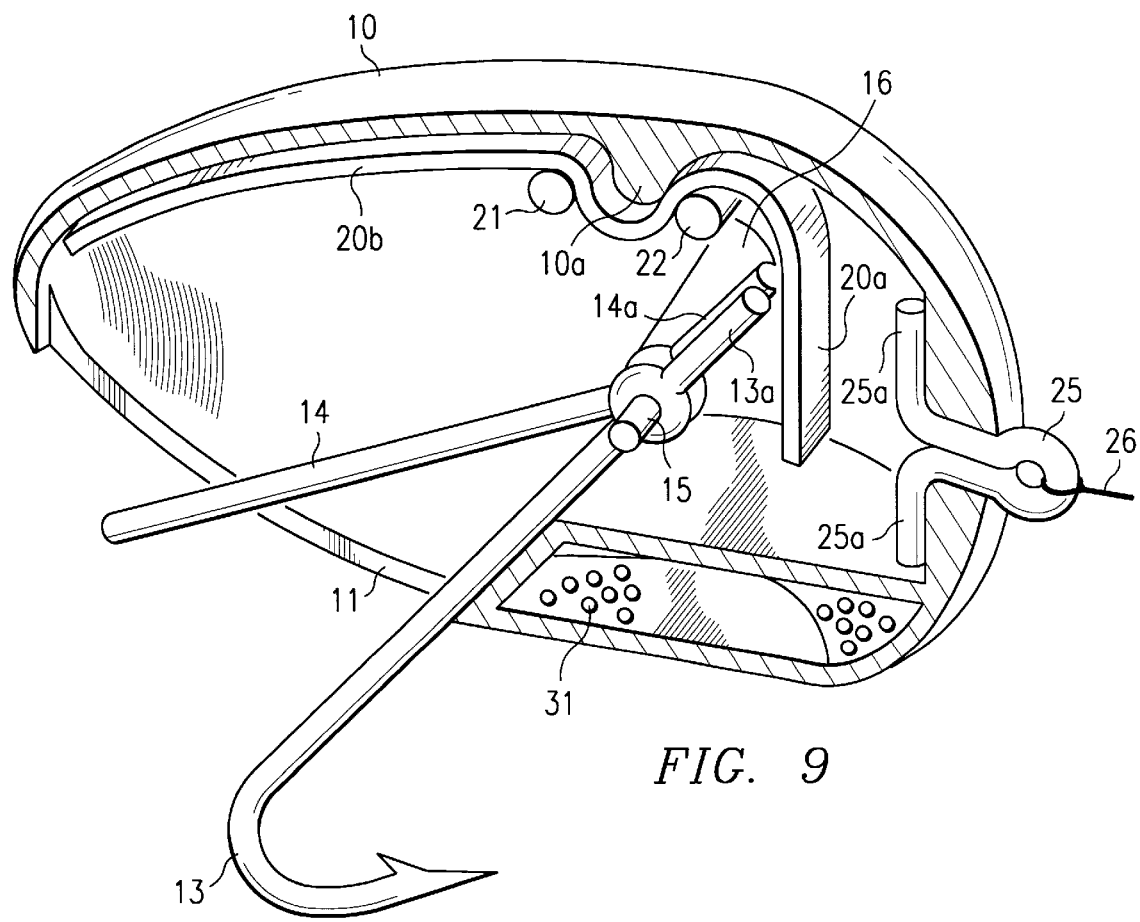
FIG. 9 is a sectional view in perspective of the device of FIG. 7 including a body having a sound chamber.

Referring to FIG. 1, one embodiment of the device of the invention includes a hollow elongated body 10 which may be formed of a suitable plastic, wood, or metal. The body 10 includes an elongated slot 11 extending from one end of the body to approximately the center of the body for a hook and a hook release lever. The body also includes an end opening 12 for an eyelet or eyelet latch, depending on the embodiment of the device. A hook 13 having a hook extension end 13a and a hook release lever 14 having an extension end 14a are both mounted on a pin axle 15 extending transversely in the body 10 within a sleeve bearing 16, see FIG. 8. The hook is fully retractable into the body 10 and extendable exterior of the body 10 through the slot 11 as illustrated in FIGS. 4 and 9. An end portion of the hook release lever 14 extends out of the body 10 through the slot 11. A hook operator and latch spring 20 is mounted in the body 10 held in place by transverse lugs 21 and 22 which lock and engage an internal arc portion of the spring against an internal nodule 10a formed in the body between the lugs. It will be evident that the function of the nodule 10a could be performed by a third lug mounted between the lugs 21 and 22. The spring 20 may be referred to as a "double spring" having a natural configuration as illustrated in FIG. 4 so that the relaxed shape of the latch end 20a of the spring is in an interfering position with the hook extension 13a as represented in FIGS. 1 and 8, and the hook operating end 20b of the spring is in a hook extending position as represented in FIGS. 4 and 9. In the embodiment of the device illustrated in FIGS. 1–4 and 8, an eyelet-latch 23 is rotatably mounted through the body opening 12, movable between a hook locking or latch position as illustrated in FIG. 1 and a release position shown in FIGS. 2–4 and 8. The eyelet-latch 23 has an inward latch end 23a and an outer eyelet end 23b. The latch end 23a is shaped to interfere with the spring end 20a and the hook end 13a at the latch position and move when rotated to a release position as represented in FIGS. 2–4 and 8.

An alternate form of eyelet 25, not including a latch feature, is mounted through the body opening 12 as illustrated in FIGS. 7 and 9. The eyelet 25 has inward portions 25a extending in opposite directions internal of the body to retain the eyelet with the body. A fishing line 26 is attachable to each of the eyelets for connecting the hooking device to a fishing pole or trotline, or the like, not shown.

FIGS. 8 and 9 show a cavity 30 formed along a side of the body 10, which may be considered the bottom of the body. The cavity may contain loose particles 31 such as shot, pebbles, or the like to produce a noise when the device moves in water.

OPERATION OF THE INVENTION

The use of the hooking device of the invention will first be described in terms of the embodiment illustrated FIGS. 1–4 and 8. A line 24, from a trotline or a fishing pole, is attached to the eyelet 23b for supporting and dragging the device through water. For safety considerations, until the device is actually dropped into the water, the device is set in a safety mode with the hook retracted into the body. If the hook 13 is initially extending outwardly of the body through the slot 11, the eyelet latch 23 is at a non-latching position at which the inward latch end 23a does not interfere with the hook extension end 13a and the spring end 20a. The hook 13 is manually raised or rotated clockwise as seen in FIG. 1 until the hook end is fully within the body 10 and the hook extension end 13a engages and cams the spring end 20a to the right as viewed in FIG. 3 until the hook extension end 13a is below the lower end of the spring end 20a. The hook release lever 14 is moved counterclockwise to allow the spring end 20a to spring back to the position of FIG. 1 (also the position shown in FIG. 7) at which the hook extension end 13a is below the lower end of the spring end 20a. The hook also forces the spring end 20b upwardly against the top inside surface of the body as shown in FIGS. 1 and 7. The eyelet 23 is then rotated to the position represented in FIG. 1 at which the eyelet latch end 23a engages the ends of both the hook extension 13a and the spring end 20a thereby holding the hook retracted and preventing the spring end 20a from moving from the latched engagement with the hook extension end 13a. The hooking device is then in the safety mode in which the hook cannot be extended from the body through the slot 11 to accidentally injure the fisherman. It will be recognized, however, that before dropping the hooking device into the water the eyelet-latch 23 must be rotated to move the latch end 23a away from the interfering relationship with the spring end 20a and the hook extension end 13a. The hook release lever 14 extends through the slot 11 with end of the release below the body for contact by a fish. The hooking device is then dropped into the water ready for use.

In the event that the embodiment of the hooking device shown in FIGS. 7 and 9 is being used there is no safety latch though the hook is locked in the retracted position by engagement of the hook extension 13a with the lower end edge of the spring end portion 20a. Of course, in this event, it is not necessary to rotate the eyelet 25 to prepare the device for fishing.

When the fishing device is dropped into the water, the hook 13 is retracted at the position shown in FIGS. 1–3, 7, and 8 and the hook release lever extends through the slot 11 with a portion of the lower end of the hook release lever projecting through the bottom of the body 10 along the lower back end of the device as it is hanging from and may be dragged along in the water by the line 26. When a fish bites the device, the mouth of the fish will engage the exposed end of the hook release lever 14 rotating the lever clockwise so that the end 14a of the hook release lever engages the spring portion 20a forcing the spring portion to the right as viewed in FIGS. 1 and 3 until the lower end of the spring portion 20a is moved out of interfering engagement with the end portion 13a of the hook. The hook is then free to rotate in a counter-clockwise direction on the axle 15. With the hook released the spring portion 20b, which has been held up by the hook, is free to spring downwardly toward the relaxed position forcing hook in a counter-clockwise direction downwardly through the slot 11 in the housing to the extended position shown in FIGS. 4 and 9. As the hook is forced downwardly from the device housing the hook end engages the mouth of the fish.

After the fish has been caught, the hook is removed from the mouth of the fish. The hook is then rotated clockwise back to the retracted position inside the body 10 with the hook extension end 13a forcing the spring end 20a to the right until the hook extension end lies below the end of the spring portion 20a which will latch the hook in the retracted position until again released by the hook release lever 14. For safety considerations, if the eyelet latch embodiment of the device is being used, the eyelet is rotated back to the position at which the latch end portion 23a again engages the hook extension 13a and the spring portion 20a as best seen in FIG. 1.

If the embodiment of the device shown in FIGS. 8 and 9 is used, the sound chamber 30 may be partially filled with the loose particles 31 which may be pebbles, beads, metal shot, or any other material to rattle in the chamber, making a noise to attract fish as the device is pulled through the water.

Either embodiment of the device may be disguised in a number of ways to mimic or appear as desirable prey a fish may consider as a meal. The outer surface of the device may be painted or the device body may be covered in a way to resemble a frog, a fish, a worm, a bug, or any other image which might entice a fish to bite. The disguise or covering is only required to have an opening in the lower portion to coincide with the slot 11 in the body 10 of the device to permit the hook to operate.

It will now be seen that a fish hooking device has been disclosed that is simple in construction, has a retractable hook which, until a fish strikes, will not snag growth or other debris in the water, has safety features protecting the fisherman, and is readily actuated to extend the hook when a fish does strike.

What is claimed is:

1. A fish hooking device comprising:

a. a hollow body having an elongated slot along one side and an eyelet opening in one end;

b. a transverse pin axle secured in the body;

c. a hook rotatably mounted on the axle, the hook extending from one side of the axle and being movable from a first position retracted in the body and a second position extending through the slot in the body to an external position for hooking a fish;

d. a hook extension formed with the hook extending from an opposite side of the axle;

e. a hook release lever rotatably mounted on the axle and extendable from one side of the axle through the elongated slot for contact by a fish;

f. a hook release lever extension formed with the hook release lever extending from an opposite side of the axle;

g. a hook operator and latch spring mounted in the body having a hook operating and biased against the hook to rotate and extend the hook through the slot to a fish hooking position external of the body and a second latch end biased to a latch position engaging the hook extension to latch the hook retracted in the body and movable to a hook release position by the hook release lever extension when rotated by the hook release lever; and h. an eyelet mounted through the eyelet opening in the body for securing a line to the body.

2. A fish hooking device according to claim 1 wherein the eyelet is rotatable and includes a latch end in the body movable to an interfering position engaging the hook extension and the spring latch end to releasably lock the hook retracted in the body.

3. A fish hooking device according to claim 1 wherein one end of the spring is curved to a normal position against the hook to move the hook to the second extended position, a second opposite end of the spring is curved to a normal position engaging the hook extension, and the spring has a curved central section secured between mounting lugs formed in the body.

4. A fish hooking device according to claim 3 wherein the eyelet is rotable and includes a latch end in the body movable to an interfering position engaging the hook extension and the second opposite end of the spring to releasably lock the hook retracted in the body.

5. A fish hooking device according to claim 4 including a sound chamber in the body for loose particles to create a sound when the hooking device moves in the water.

6. A fish actuated hooking device comprising:

(a) a hollow body having an elongated slot along one side;

(b) a transverse pin axle in the body;

(c) a fish hook rotatably mounted on the pin axle for movement between a retracted position in the body and an extended position out of the body through the slot;

(d) a hook release lever rotatably mounted on the pin axle extending outwardly through the elongated slot;

(e) a double spring in the body having one end biasing the hook to the extended position and a second end to latch the hook retracted in the body;

(f) the release lever coacting with the second end of the spring to move the second end of the spring from a hook latch position to a hook release position; and (g) an eyelet mounted at one end of the body for securing a line to the body.

\* \* \* \* \*